(12) United States Patent
Male et al.

(10) Patent No.: US 11,303,108 B2
(45) Date of Patent: *Apr. 12, 2022

(54) GALVANIC ISOLATION FOR RELAY DEVICE

(71) Applicant: TEXAS INSTRUMENTS INCORPORATED, Dallas, TX (US)

(72) Inventors: Barry J. Male, West Granby, CT (US); Miroslav Oljaca, Allen, TX (US); David W. Stout, Lewisville, TX (US); Ajinder Singh, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,166

(22) Filed: May 5, 2020

(65) Prior Publication Data

US 2020/0335963 A1      Oct. 22, 2020

Related U.S. Application Data

(63) Continuation of application No. 15/689,246, filed on Aug. 29, 2017, now Pat. No. 10,644,495.

(51) Int. Cl.
| | |
|---|---|
| *H02H 3/10* | (2006.01) |
| *H02H 3/093* | (2006.01) |
| *H02H 3/08* | (2006.01) |
| *H02H 3/20* | (2006.01) |
| *H02H 1/06* | (2006.01) |

(52) U.S. Cl.
CPC .............. *H02H 3/10* (2013.01); *H02H 1/06* (2013.01); *H02H 3/085* (2013.01); *H02H 3/093* (2013.01); *H02H 3/207* (2013.01); *H02H 3/08* (2013.01)

(58) Field of Classification Search
CPC ........... H02H 3/10; H02H 1/06; H02H 3/207; H02H 3/085; H02H 3/093; H02H 3/08
USPC ...................................................... 361/19, 90
See application file for complete search history.

(56) References Cited

U.S. PATENT DOCUMENTS

| | | | |
|---|---|---|---|
| 6,531,899 B1 | 3/2003 | Male | |
| 6,639,395 B2 | 10/2003 | Male | |
| 8,728,846 B2 | 5/2014 | Male et al. | |
| 9,349,933 B2 | 5/2016 | Male et al. | |
| 10,135,439 B2* | 11/2018 | Calabrese | ............ H03K 17/691 |
| 2017/0237249 A1* | 8/2017 | Kunow | .................... H02H 7/20 |
| | | | 361/88 |

(Continued)

*Primary Examiner* — Dharti H Patel
(74) *Attorney, Agent, or Firm* — Mark Allen Valetti; Charles A. Brill; Frank D. Cimino

(57) ABSTRACT

One example includes a relay device that is comprised of a galvanic isolation barrier, a protection control and power extractor, and an electronic switch. The galvanic isolation barrier is coupled to an input of the relay device and receives a switch control signal and outputs another switch control signal. The protection control and power extractor is coupled to an output of the galvanic isolation barrier. The protection control and power extractor extracts power from a power supply coupled to the relay device. The protection control and power extractor is responsive to the other switch control signal and generates a protection signal in response to a determination of an operating parameter of the relay device. The protection control and power extractor further outputs an electronic switch device signal based on the generated protection signal.

12 Claims, 6 Drawing Sheets

(56) References Cited

U.S. PATENT DOCUMENTS

2018/0158633 A1* 6/2018 Brandt ................. H01H 47/002
2019/0067930 A1* 2/2019 Male ..................... H02H 3/085

* cited by examiner

GALVANIC ISOLATION FOR RELAY DEVICE

CROSS-REFERENCE TO RELATED APPLICATION

This application claims priority to U.S. patent application Ser. No. 15/689,246, filed Aug. 29, 2017. The entire disclosure of Ser. No. 15/689,246 is hereby fully incorporated herein by reference.

BACKGROUND

A relay is an electrically operated switch in that it is activated by a signal in one circuit to open or close another circuit. The activation signal is typically a low-power signal relative to power that is being switched. Relays may be constructed as solid-state relays which include no-moving parts. Relays are used in a variety of applications including automotive, heating and air conditioning, computers, telecommunications, etc.

SUMMARY

One example includes a relay device that is comprised of a galvanic isolation barrier, a protection control and power extractor, and an electronic switch. The galvanic isolation barrier is coupled to an input of the relay device and receives a switch control signal and outputs another switch control signal. The protection control and power extractor is coupled to an output of the galvanic isolation barrier. The protection control and power extractor is responsive to the other switch control signal and generates a protection signal in response to a determination of an operating parameter of the relay device. The protection control and power extractor extracts power from a power supply coupled to the relay device. The protection control and power extractor further outputs an electronic switch device signal based on the generated protection signal. The electronic switch device is coupled to an output of the protection control and power extractor and initiates/terminates the power supply supplying power to a load in accordance with the electronic switch device signal.

Another example includes a method that includes galvanically isolating a switch control signal from an other switch control signal. The method further includes generating a protection signal in response to a determination of an operating parameter of a relay device and in response to the other switch control signal. The method further includes outputting an electronic switch device signal based on the generated protection signal. The method further includes switching an electronic switch device to electronically initiate/terminate the power supply supplying power to a load in accordance with the electronic switch device signal. The method further includes extracting power from the power supply. The method further includes capturing the extracted power with an energy storage device.

Another example includes another relay device that is comprised thermo-electric-isolation (TEI) galvanic isolation barrier, relay controller, self-power control loop, and a pair of metal-oxide semiconductor field-effect transistors (MOSFETs). The thermo-electric-isolation (TEI) galvanic isolation barrier is coupled to an input of the relay device, receives a switch control signal, and outputs an other switch control signal. The relay controller is coupled to an output of the TEI galvanic isolation barrier and is responsive to the other switch control signal to generate a gate driver signal in response to receiving a protection signal from a protection element of the relay device. The self-power control loop extracts power from a power supply, captures the power with an energy storage device, monitors a voltage of the energy storage device, and causes the relay controller to output the gate driver signal in response to the voltage of the energy storage device falling below a threshold value to extract power from the power supply with the energy storage device. The pair of MOSFETs initiates/terminates the power supply supplying power to a load in accordance with the gate driver.

DETAILED DESCRIPTION

The disclosure relates to a relay device that maintains isolation from an input signal to the relay device. For example, a galvanic isolation barrier is coupled to the input of the relay device to electrically isolate the input from other components of the relay device. An example includes a relay device that includes a galvanic isolation barrier, a protection control and power extractor, and an electronic switch device (e.g., transistor). The galvanic isolation barrier is coupled to an input of the relay device and receives a switch control signal and outputs an other switch control signal. The protection control and power extractor is coupled to an output of the galvanic isolation barrier. The protection control and power extractor extracts power from a power supply supplying power to the relay device. The protection control and power extractor is responsive to the other switch control signal and generates a protection signal in response to a determination of an operating parameter of the relay device. The protection control and power extractor further outputs an electronic switch device signal based on the generated protection signal. The electronic switch device is coupled to an output of the protection control and power extractor and initiates/terminates the power supply supplying power to a load in accordance with the electronic switch device signal.

Such an example relay device maintains isolation of the input signal. Such isolation protects the relay device from potential damaging input signals. The relay device provides for a simple relay solution, high reliability, low cost, low power consumption, and a small footprint. Such a relay device utilizing a transistor based electronic switch device overcomes clicking noises produced by other electro-mechanical relay devices, and is more reliable due to a lack of moving parts. Moreover, an example adds protection functions to mitigate damage to the relay device and/or a load. In some examples, the relay device implements self-powering circuitry to allow the relay device to operate from power extracted from a power supply that is initiated/terminated from supplying power to a load, without requiring a separate power supply as is required by other relay devices. The relay device further may be fabricated as a monolithic device (an integrated circuit chip), providing further cost advantages.

Figure 1:
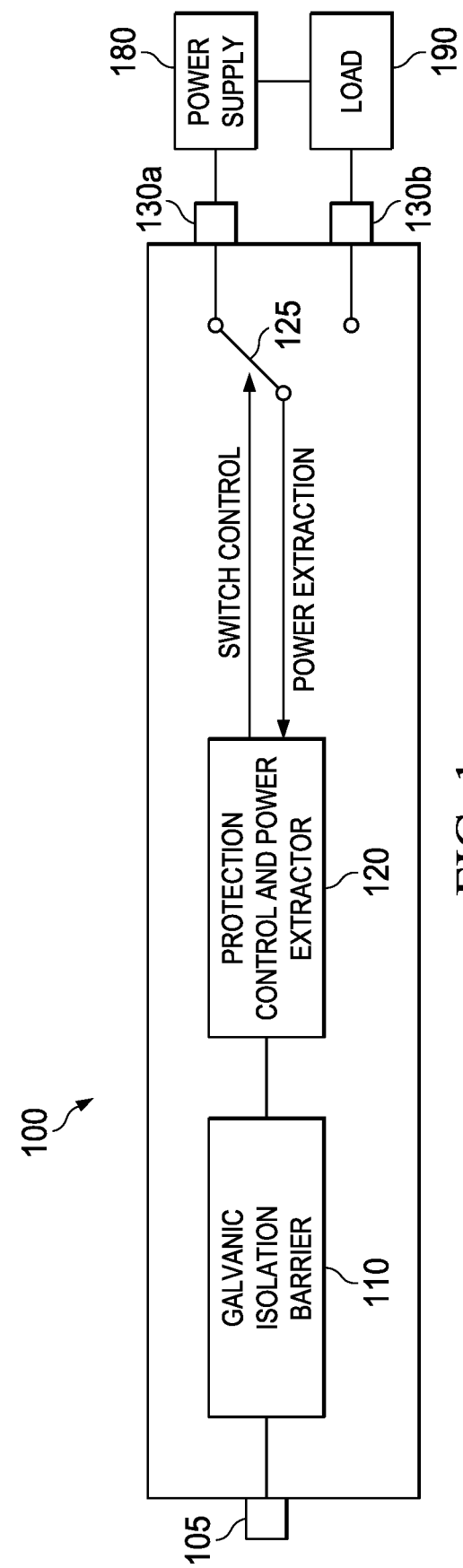
FIG. 1 illustrates an example relay device that includes galvanic isolation.

FIG. 1 illustrates an example relay device 100 that includes galvanic isolation. The relay device 100 receives a switch control signal on one or more input terminals (pin) 105. This signal includes a latch ON signal and a latch OFF signal to turn the relay device 100 ON and OFF. The signal received via terminal 105 is isolated from a protection control and power extractor 120 via an output of a galvanic isolation barrier 110 that is coupled to the protection control and power extractor 120. The galvanic isolation barrier 110 is coupled to an input of the relay device 100 and galvanically isolates a switch control signal input to the galvanic isolation barrier 110 from another switch control signal output from the galvanic isolation barrier 110. The galvanic isolation barrier 110 provides galvanic isolation between any voltages applied to an input of the relay device 100 at the terminal 105 and the components on the opposite side of the galvanic isolation barrier 110. Thus, galvanic isolation prevents current flow from input terminal 105 to the protection control and power extractor 120 while allowing switch control signals (e.g., the latch ON/OFF signals) from terminal 105 to pass to the protection control and power extractor 120 as an isolated switch control signal. Thus, the protection control and power extractor 120 is protected from any voltage spikes that may exist on terminal 105. The galvanic isolation barrier 110 may include a transformer, an opto-isolator, a hall effect sensor, a thermo-electric-isolation (TEI) galvanic isolation barrier (discussed in more detail below in FIG. 5), or any other galvanic isolation barrier that provides for galvanic isolation between the terminal 105 and the protection control and power extractor 120.

As a further example, the protection control and power extractor 120 protects the relay device 100 and a load 190, which is coupled to an output terminal (pin) 130b, from drawing an excessive amount of current from a power supply 180 coupled to another terminal (pin) 130a. In one example, the power supply 180 is an alternating current (AC) power supply. In an alternate example, the power supply 180 is a direct current (DC) power supply. The protection control and power extractor 120 includes protection components that monitor for such parameters that may include a temperature of the relay device 100, current being drawn by the load 190, a duration that the power supply 180 supplies power to the load 190, etc. Based on these example types of protection monitoring, the protection control and power extractor 120 generates a protection signal in response to a determination of an operating parameter of the relay device 100 and, based on this generated protection signal, outputs an electronic switch device signal to close an electronic switch device 125 (e.g., a transistor device) that is coupled to an output of the protection control and power extractor 120 and electrically couples terminals 130a and 130b, or opens the electronic switch device 125 to electrically decouple terminals 130a and 130b via the electronic switch device 125. Coupling/decoupling terminals 130a and 130b initiates/terminates the power supply 180 supplying power to the load 190 in accordance with the electronic switch device signal. Use of the electronic switch device 125 eliminates noise associated with opening and closing an electro-mechanical switch.

Closing electronic switch device 125 completes a conductive loop between the power supply 180 and the load 190 to enable current to flow from the power supply 180 to the load 190. Should the protection control and power extractor 120 determine that it is safe (e.g., temperature below a threshold, current drawn by the load 190 is below a threshold, etc.) to turn ON the relay device 100 and in response to an ON signal received at input terminal 105, the protection control and power extractor 120 will supply an activation signal to close the electronic switch device 125. Likewise, should the protection control and power extractor 120 determine that it is not safe to turn ON the relay device 100 in response to an ON signal received at terminal 105, the protection control and power extractor 120 will maintain the electronic switch device 125 in an open or OFF state. While the switch 125 is closed (completing the circuit path), the protection control and power extractor 120 continues to determine if it is whether permissive conditions exist to maintain an electrical coupling between the power supply 180 and the load 190 after the electronic switch device 125 is closed. The protection control and power extractor 120 will also cause the electronic switch device 125 to open in response to an OFF signal received by the relay device 100 at the terminal 105 as well as in response to detecting a condition of the relay device requiring protection.

The protection control and power extractor 120 further extracts power from the power supply 180 coupled to the relay device 100. The protection control and power extractor 120 captures this extracted power for powering the relay device 100 while the power supply 180 is supplying power to the load 190. The extracted power is stored by the relay device 100 and used to power the relay device 100 in absence of the power supply 180 supplying power to the load 190 and/or the relay device 100. Because the relay device 100 extracts and stores power from a power supply 180 that is external to the relay device 100 via the protection control and power extractor 120, the relay device 100 can operate without requiring a separate power supply. Being able to operate the relay device 100 without requiring a separate power supply simplifies construction of the relay device 100 and its connectivity, lowering a cost of manufacture of the relay device 100.

In response to the relay device 200 receiving the latch ON signal, the protection control and power extractor 120 determines whether the operating parameters of the relay device 200 and the power supply 180 are within expected operating parameters for normal operation. If the operating parameters of the relay device 200 are proper, the protection control and power extractor 120 will output a switch control signal to the electronic switch device 125 to close the electronic switch device 125 and, thereby turn ON the relay device 100. Turning ON the relay device 100 electrically couples the terminals 130a and 130b together. If the relay device 200 receives the latch OFF signal, the protection control and power extractor 120 outputs the switch control signal to the electronic switch device 125 to open the electronic switch device 125 and turn OFF the relay device 100. Turning OFF the relay device 100 electrically decouples the terminals 130a and 130b, creating an open circuit between the terminals.

Figure 2:
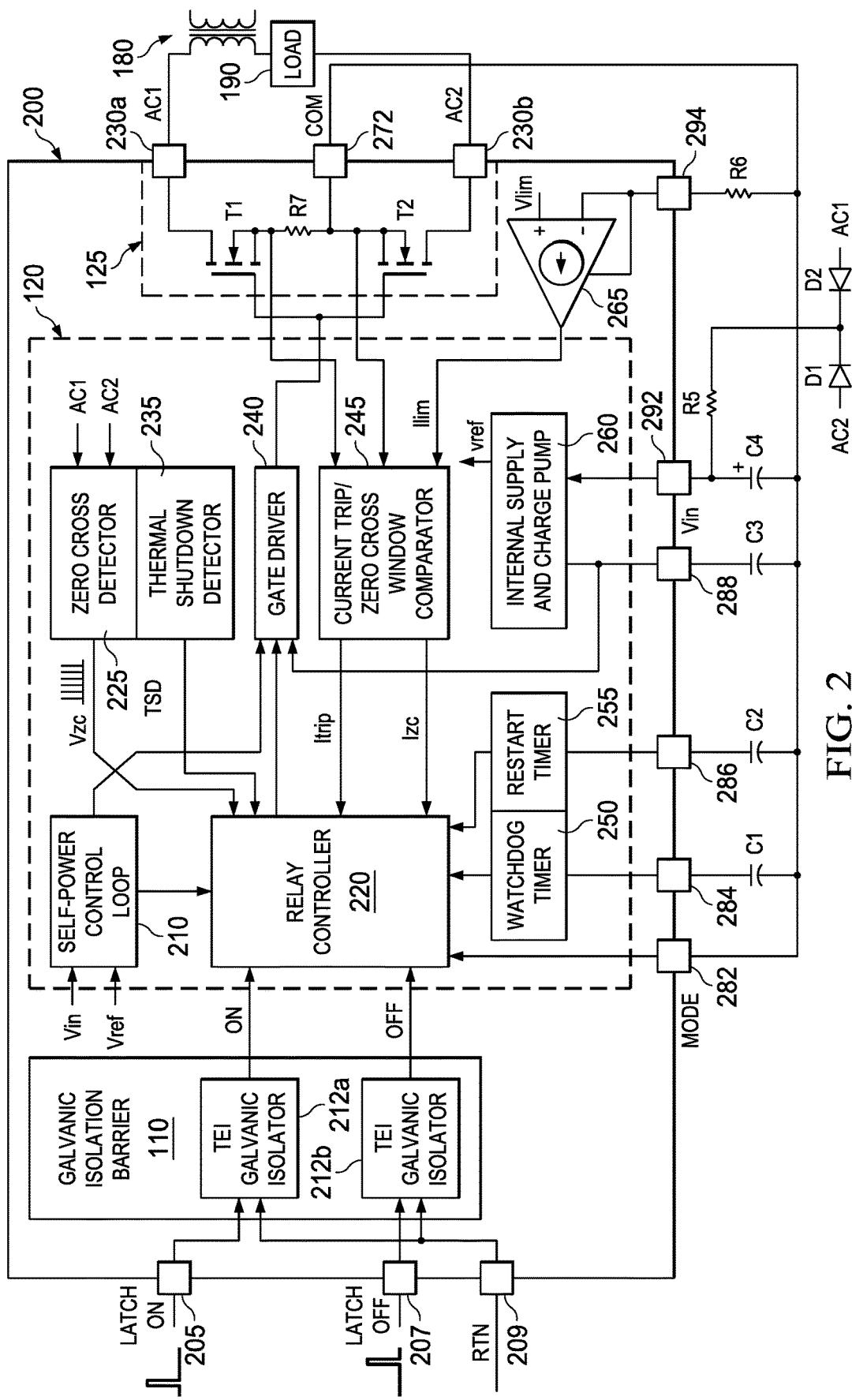
FIG. 2 illustrates another example relay device that includes thermo-electric-isolation (TEI) galvanic isolation.

FIG. 2 illustrates another example relay device 200 that includes a galvanic isolation barrier implemented within an integrated circuit (IC) chip (a monolithic device). In this example, the galvanic isolation barrier 110 is implemented as a TEI galvanic isolation barrier 212a and another TEI galvanic isolation barrier 212b that are electrically coupled to terminals 205 and 207, respectively. A latch ON signal received at terminal 205 is passed by the TEI galvanic isolation barrier 212a to the relay controller 220. Likewise, a latch OFF signal received at terminal 207 is passed by the TEI galvanic isolation barrier 212b to the relay controller 220. The TEI galvanic isolation barriers 212a and 212b are further electrically coupled to a return terminal 209 which is the return signal path for terminals 205 and 204. Capacitor C1 is coupled to terminal 284, capacitor C2 is coupled to terminal 286, capacitor C3 is coupled to terminal 288, resistor R6 is coupled to terminal 294, with an opposite side of each of the capacitors C1-C4 being coupled to common terminal 272. In an example, capacitors C1, C2, C3, and C4 are a 5V 0.01 uF capacitor, 5V 0.01 uF capacitor, 50V 0.01 uF capacitor, and 100V 4.7 uF capacitor, respectively. The relay device 200 receives a MODE signal on terminal 282 that sets a mode of the relay device 200 into one of several modes that include, e.g., a timed mode as controlled by a restart timer 255, a watchdog mode as controlled by a watchdog timer 250, etc.

In this example, the protection control and power extractor 120 includes a relay controller 220, a self-power control loop 210, the watchdog timer 250, the restart timer 255, an internal supply and charge pump 260, a zero cross detector 225, a thermal shutdown detector 235, a gate driver 240, and a current trip/zero cross window comparator 245. The relay controller 220 is coupled to the self-power control loop 210 that monitors a voltage on an energy storage device, e.g., the capacitor C4, the self-power control loop 210 also coupled to the gate driver 240. The capacitor C4 is a holding capacitor, with this capacitor's voltage being either a full supply voltage from power supply 180 when the transistors T1 and T2 are OPEN or has a diminished voltage which is periodically refreshed by the self-power control loop 210 when the transistors T1 and T2 are ON. The self-power control loop 210 periodically modulates transistors T1 and T2 into a mostly OFF state so that capacitor C4 can be replenished. The self-power control loop 210 receives voltages Vin and Vref from the internal supply and charge pump 260 and controls charging of the capacitor C4 via rectification at diodes D1 and D2 according to a voltage drop across resistor R5. For example, should the self-power control loop 210 determine that the voltage on the capacitor C4 falls below a threshold (e.g., about 6 volts), the self-power control loop 210 de-activates the electronic switch device 125 (connection shown in detail in FIG. 3) to charge the capacitor C4. Thus, the power extracted from the power supply 180 is stored in the capacitor C4. The self-power control loop 210 monitors if the capacitor C4 has been charged to a maximum threshold (e.g., 8 volts). In an example, electronic switch device 125 includes transistors T1 and T2, and resistor R7. The relay controller 220 is further coupled to a gate driver 240 and outputs an electronic switch device signal to the gate driver 240. The gate driver 240 biases gates of each of transistors T1 and T2 to extract power from the power supply 180 and initiate/terminate the power supply 180 supplying power to the load 190, in response to the electronic switch device signal. This extraction occurs momentarily (e.g., 10 ms) to charge the capacitor C4 to this maximum threshold (e.g., about 8 volts). The relay controller 220 outputs a signal to gate driver 240 to bias the gates of the transistors T1 and T2 to discontinue charging capacitor C4. In an example, T1 and T1 are both 60V metal-oxide semiconductor field-effect transistors (MOSFETs).

The relay controller 220 is further coupled to the zero cross detector 225. In an example where the power supply 180 is an alternating current (AC) power supply, the zero cross detector 225 monitors a voltage of the AC power supply 180. The zero cross detector 225 inputs the AC1 signal from terminal 230a and the AC2 signal from terminal 230b. When the zero cross detector 225 determines that the voltage of the power supply 180 is at zero volts after the relay device 200 receives a latch ON signal, the zero cross detector 225 outputs a protection signal, e.g., Vzc signal to the relay controller 220. This Vzc signal indicates that the power supply 180 can safely supply power to the load 190 via coupling terminals 230a and 230b. The relay controller 220 outputs the electronic switch device signal to the gate driver 240 which outputs a signal to the transistors T1 and T2 to switch ON when the power supply 180 is at zero volts, thereby electrically coupling the power supply 180 and the load 190. Switching the relay device 200 ON at this instant when the power supply 180 is at zero volts mitigates electrical interference from being generated within the relay device 200. The output of the gate driver 240 is also coupled to the gates of the transistors T1 and T2. A drain of the transistor T1 is electrically coupled to terminal 230a and a drain of the transistor T2 is electrically coupled to terminal 230b. A source of the transistor T1 is electrically coupled to the current trip/zero cross window comparator 245 and a resistor R7. In an example, R7 has a resistance of about 5 mΩ. A source of the transistor T2 is coupled to an opposite side of this resistor R7 and to common terminal 272, the source of the transistor T2 also being coupled to the current trip/zero cross window comparator 245.

The relay controller 220 is further coupled to the thermal shutdown detector 235. The thermal shutdown detector 235 monitors a temperature of the relay device 200. In the event that the thermal shutdown detector 235 determines that the temperature of the relay device 200 exceeds a temperature threshold (e.g., 160 Celsius), the thermal shutdown detector 235 outputs a protection signal, e.g., TSD signal to the relay controller 220 instructing the relay controller 220 to shut down the relay device 200. This shutdown of the relay device 200 protects the relay device 200 from temperatures that may damage the relay device 200. In response to this TSD signal, the relay controller 220 will output the electronic switch device signal to the gate driver 240 which will enable the gate of each of the transistors T1 and T2 to electrically terminate the power supply 180 supplying power to the load 190 and shut down the relay device 200.

The relay controller 220 is further coupled to the current trip/zero cross window comparator 245. The current trip/zero cross window comparator 245 monitors current being drawn by the load 190. The current trip/zero cross window comparator 245 determines whether the load 190 is drawing a current that exceeds a current threshold, such as set by a resistor R6. In an example, R6 has a resistance of about 100 KΩ. One side of resistor R6 is coupled to common terminal 272 and another side of resistor R6 is coupled to an inverting input of operational amplifier 265 via terminal 294. The operational amplifier 265 has one input coupled to terminal 294 and a non-inverting input of the amplifier is coupled to a voltage Vlim. In an example, Vlim is approximately 1 volt to set a 1 volt drop across resistor R6. The operational amplifier 265 outputs a current Ilim. The current trip/zero cross window comparator 245 is further coupled to a source of each of transistors T1 and T2 and thus receives a current signal proportional to the current flowing through each of transistors T1 and T2. When the current drawn by the load 190 as measured across R7 exceeds Ilim, the current trip/zero cross window comparator 245 outputs a protection signal, e.g., Itrip signal to the relay controller 220 to interrupt current flow from the power supply 180 to the load 190. Terminating current flow form the power supply 180 to the load 190 in such an instance helps to protect the transistors T1 and T2 from excessive current. In response to this Itrip signal, the relay controller 220 will output the electronic switch device signal to the gate driver 240 which will control the gate of each of the transistors T1 and T2 to electrically interrupt current flow from the power supply 180 to the load 190.

In the event that the load 190 is inductive, current may still flow to the load 190 after the switch 125 has been deactivated to terminate the power supply 180 from supplying power to the load 190. To mitigate a transient that would result from stopping current flow to the load 190 in such an instance, the current trip/zero cross window comparator 245 also determines when current drawn by the load 190 diminishes to approximately zero in absence of the power supply 180 supplying power to the load 190 and/or the relay device 200. For example, the current trip/zero cross window comparator 245 outputs a protection signal, e.g., Izc signal to the relay controller 220 if current drawn by the load 190 decreases to approximately zero. In response to the Izc signal, the relay controller 220 will output the electronic switch device signal to the gate driver 240, which control the gate of each of the transistors T1 and T2 to terminate supplying power (current flow) from the power supply 180 to the load 190.

The relay controller 220 is further coupled to the watchdog timer 250. The watchdog timer 250 monitors for a periodic signal (e.g., a keep alive signal) on terminal 205 (connection not shown). In the event that the watchdog timer 250 does not receive this periodic signal, the watchdog timer 250 outputs a protection signal (e.g., a reset signal) to the relay controller 220. In response to this reset signal, the relay controller 220 outputs the electronic switch device signal to the gate driver 240 which controls the gate of each of the transistors T1 and T2 to terminate current flow from the power supply to the load 190. In the event that the watchdog timer 250 receives this period signal, the watchdog timer 250 does not provide the reset signal and continues to monitor for this periodic signal.

The relay controller 220 is further coupled to the restart timer 255. The restart timer 255 counts a predetermined period of time as a basis to re-start the supply of current from the power supply 180 to the load 190 in a situation where the current drawn by the load 190 exceeded Ilim, and the controller 220 discontinued current flow from the power supply 180 to the load 190. The re-start timer is used in applications where the power to the load needs to be autonomously re-applied after an overload event and after the appropriate "cool-down" time as determined by the restart timer 255. The restart timer 255 begins counting to a programmable amount of time, as determined by capacitor C2, when the controller 220 discontinues current flow from the power supply to the load 190. Once the restart timer 255 counts for the programmable amount of time, the restart timer 255 outputs a protection signal (e.g., a signal) to the relay controller 220 to restore current flow from the power supply 180 to the load 190. In response to this signal, the relay controller 220 will output the electronic switch device signal to the gate driver 240 which will enable the gate of each of the transistors T1 and T2 to restore current flow from the power supply 180 to the load 190.

The relay controller 220 is further coupled to the internal supply and charge pump 260. The internal supply and charge pump 260 generates one or more voltages for powering the various components of the relay device 200. For example, the internal supply and charge pump 260 produces voltages V1, V2, and Vref. The internal supply and charge pump 260 is electrically coupled to terminal 288 and terminal 292 that is coupled to Vin, with terminal 288 also coupled to gate driver 240. The gate driver 240 is also coupled to the self-power control loop 210. Terminal 292 is further coupled to resistor R5, the opposite side of which is coupled to cathodes of diodes D1 and D2. Anodes of the diodes D1 and D2 are electrically coupled to AC2 and AC1 signals at terminals 230b and 230a, respectively. The internal supply and charge pump 260 takes the voltage on capacitor C4 and pumps that voltage up to a higher level and applies that higher voltage to terminal 288, which is used to store a charge in capacitor C3. Capacitor C3 is a charge storage capacitor for the charge pump 260. This higher voltage is used to charge the gates of the transistors T1 and T2, with the transistors T1 and T2 having a capacitance between their respective sources and gates. In an example, terminal 288 is charged to about 15 V.

Figure 3:
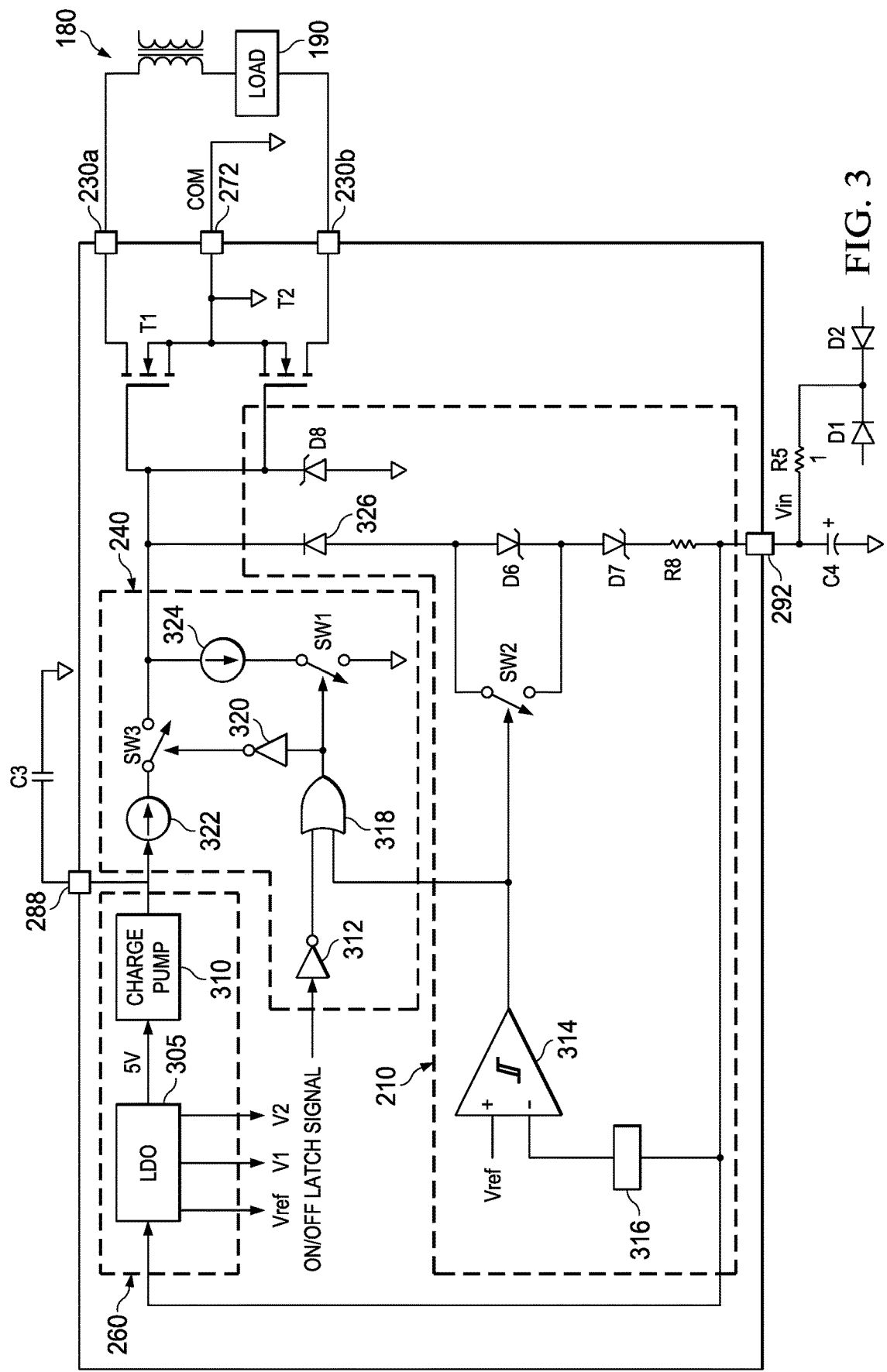
FIG. 3 illustrates an example of an internal supply and charge pump, a self-power control loop, and a gate drive of FIG. 2.

FIG. 3 illustrates an example of the internal supply and charge pump 260, the self-power control loop 210, and the gate drive 240 of FIG. 2 implemented in the relay device (a solid state relay chip device) 200. The self-power control loop 210 includes a hysteretic comparator 314, a voltage divider 316, a switch SW2, and a diode 326, a diode D8, a Zener diode D6, another diode D7 (e.g., Zener diode), and a resistor R8. The gate driver 240 includes a current source 322, a switch SW3, an inverter 320, an inverter 312, an OR gate 318, and a current source 324. The internal supply and charge pump 260 includes a low-dropout (LDO) regulator 305 and a charge pump 310.

The LDO regulator 305 produces the voltages V1, V2, and Vref. The LDO regulator 305 also produces a regulated voltage (e.g., 5V) for the charge pump 310. In an example, the charge pump 310 is a 3× pump of a regulated 5V. The internal supply and charge pump 260 outputs a signal to the gate driver 240 and is coupled to the terminal 288. The current source 322 is coupled to and provides current to the switch SW3. In an example, the charge pump 310 and the current source 322 together produce about 13 volts and about 50 micro-amps. Switch SW3 is coupled to and controlled by a signal that is output from the inverter 320 and responsive to the ON/OFF latch signal. Switch SW3 is also coupled to the current source 324 which is coupled to one side of the switch SW1, the other side of switch SW1 being coupled to common terminal 272. Switch SW3 is also coupled to the cathode of the diode 326. An anode of the diode 326 is coupled to one side of switch SW2 and to an anode of diode D6 (e.g., Zener diode). In an example, diode D6 is a 42 V Zener diode. The other side of switch SW2 and the cathode of the diode D6 are coupled to an anode of another diode D7 (e.g., Zener diode), a cathode of the diode D7 being coupled to one side of the resistor R8. In an example, diode D7 is a 6 V Zener diode. The other side of the resistor R8 is coupled to the voltage divider 316 and to the internal supply and charge pump 260 that generates regulated DC voltages V1, V2, and Vref. A cathode of diode 326 is coupled to the gate of both of the transistors T1 and T2, the gate of both of the transistors T1 and T2 also being coupled to a cathode of the diode D8 (e.g., Zener diode). An anode of the diode D8 is coupled to common terminal 272. The diode D8 mitigates over voltage on the gates of the transistors T1 and T2. In an example, the diode D8 is an 18 V diode.

An inverter 312 receives the latch ON or OFF switch control signal from the TEI galvanic isolation barriers 212a and 212b, respectively. The inverter 312 outputs an inversion of the latch ON or OFF switch control signal to an input of the OR gate 318. Another input of the OR gate 318 is coupled to an output of the hysteretic comparator 314, and an output of the OR gate 318 is coupled to an input of the invert 320 and is coupled to and controls switching state of the switch SW1. An input to the hysteretic comparator 314 is coupled to receive Vref and another input of the hysteretic comparator 314 is coupled to receive the voltage divider 316. In an example, the voltage divider 360 outputs a fractional part (e.g., about ¼) of the voltage of its input. The hysteretic comparator 314 is coupled to switch SW2 and thus controls an open/close state of the switch SW2. When the switch SW3 is closed and switch SW1 is open, the gates of respective transistors T1 and T2 are charged with the current produced by the current source 322. To discharge the gates of the respective transistors T1 and T2, switch SW3 is opened and switch SW1 is closed to ground the gates of the transistors T1 and T2. The hysteretic comparator 314 compares the voltage on the capacitor C4 to a Vref threshold value. In an example, the low threshold corresponds to about 6 volts at VIN and the high threshold corresponds to about 8 volts at VIN. When the voltage on the capacitor C4 is greater than the high threshold voltage (e.g., about 8 volts), the transistors T1 and T2 are turned ON and OFF in accordance with the latch ON/OFF signal input to the inverter 312. When the voltage of the capacitor C4 drops below the 6 volt threshold voltage, switch SW1 is closed to turn off the transistors T1 and T2 to extract power from the power supply 180 and charge capacitor C4. As the voltage of the capacitor C4 rises above the 8V threshold, the gate of transistors T1 and T2 are charged to turn the transistors T1 and T2 back ON. The turning of the transistors T1 and T2 OFF and back ON after the capacitor C4 is charged occurs within a very short period of time such that the load 190 experiences a small droop in voltage but does not detect a termination of a voltage from of the power supply 180. In an example, this duty cycle occurs in approximately 10 μs. In some examples, each of the switches SW1, SW2 and SW3 are implemented as MOSFET devices. Other types of switch devices (e.g., thyristors, bipolar transistors, insulated-gate bipolar transistors (IGBTs), or other transistors) could be used in other examples.

Figure 4:
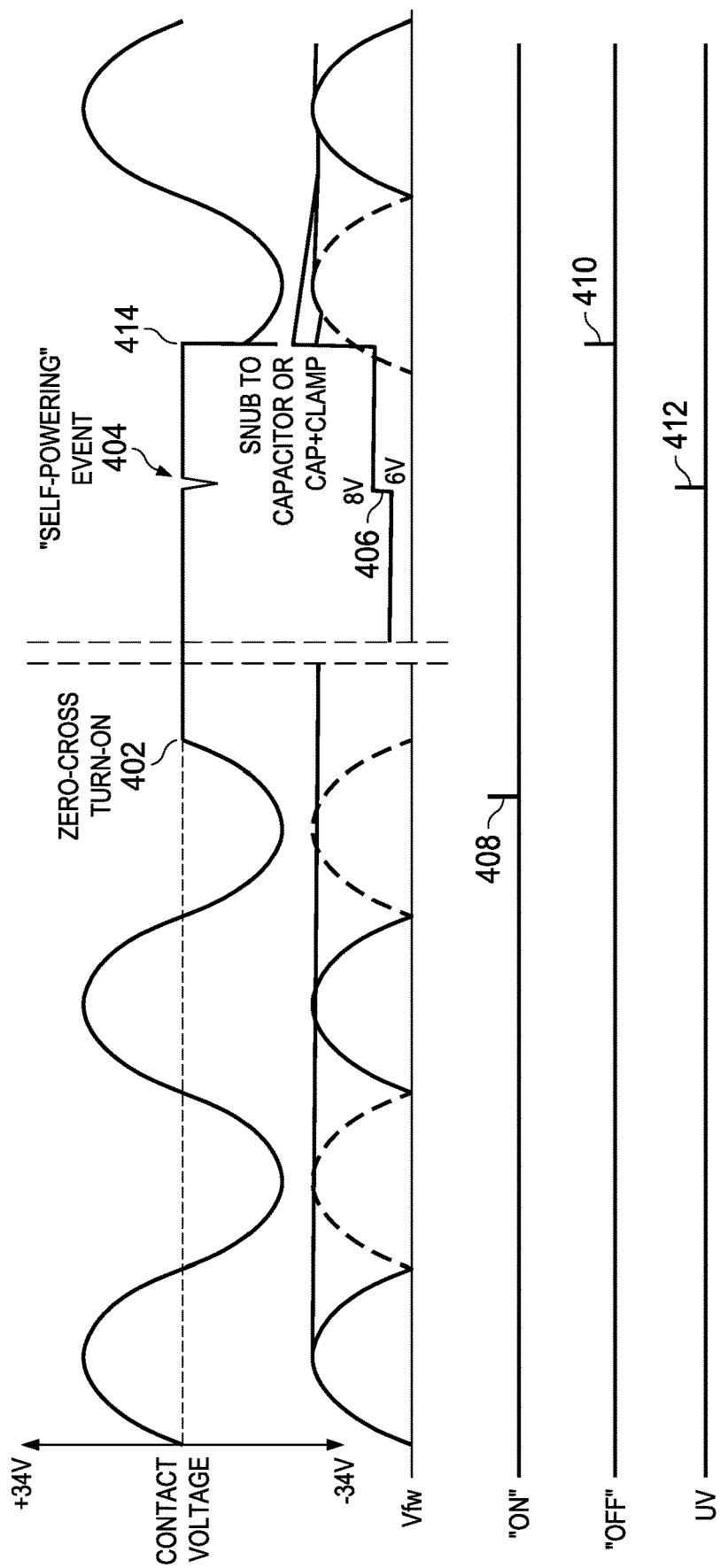
FIG. 4 illustrates example voltages and latch signals at various elements shown in FIG. 1-3.

FIG. 4 illustrates example voltages and latch signals at various elements shown in FIGS. 1-3. In this example, the voltage at terminals 130a,b and 230a,b is an alternating current (AC) voltage of 24 volts shown as contact voltage. A self-powering event, for example an interruption of the voltage produced by the power supply 180, may occur at point 404. The self-powering event causes the relay devices 100/200 to operate off of the power previously extracted from the power supply 180 and captured with the capacitor C4.

A DC forward voltage Vfw, derived from the 24 VAC, swings between 0 volts and the approximate peak voltage of the 24 VAC contact voltage. This Vfw is utilized to maintain the voltage of the capacitor C4 between 6 volts and 8 volts (DC) at point 406. The protection control and power extractor 120 shown in FIG. 1 and the self-power control loop 210 in combination with the transistors T1 and T2, shown in FIGS. 1-3, extract power from the power supply 180 coupled to the relay device 210 to charge the capacitor C4, e.g., to 8 volts. Thereafter the relay devices 100/200 can be powered by this extracted power which lowers the voltage on the capacitor C4. Once the voltage of the capacitor C4 drops to 6 volts, the capacitor C4 is again charged to 8 volts. The self-power control loop 210 generates an under voltage latch signal at point 412 in response to the voltage of the capacitor C4 dropping below 6 volts, which results in the capacitor C4 being charged from the 6 volts to the 8 volts. This process is continuously repeated to maintain a voltage on the capacitor C4 between 6 and 8 volts to enable self-powering of the relay.

The relay devices 100/200 may receive a latch ON signal at point 408. In response to this latch ON signal, the relay devices 100/200 will turn ON at a next zero-cross voltage, shown at point 402, via monitoring and control of the zero cross detector 225, as discussed above. The relay devices 100/200 may receive a latch OFF signal at point 410. In response to this latch OFF signal, the current trip/zero cross window comparator 245 is applied at point 414 to mitigate immediate termination of the power supply 180 supplying current to the load 190, to suppress transient voltages that result from turning OFF the relay devices 100/200.

Figure 5:
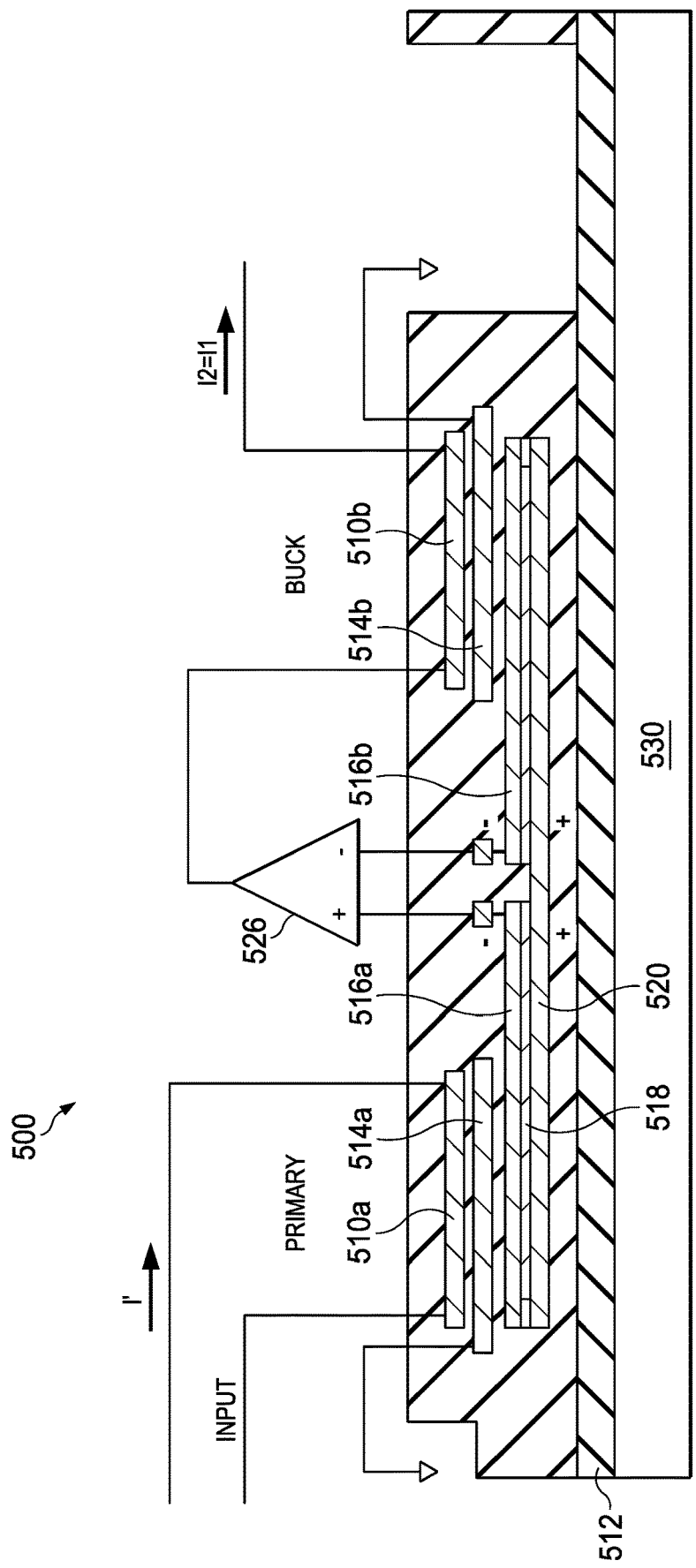
FIG. 5 illustrates an example thermo-electric-isolation (TEI) galvanic isolation barrier.

FIG. 5 illustrates an example TEI galvanic isolation barrier 500, such as can be utilized as the isolation barrier (e.g., barrier 110, 212a, 212b) disclosed herein. The TEI galvanic isolation barrier 500 provides ground-break isolation between an input side of the TEI galvanic isolation barrier 500 and an output side of the TEI galvanic isolation barrier 500. The TEI galvanic isolation barrier 500 provides analog, direct current (DC) isolation between the input side and the output side, with no intermediate conversion to an alternating current (AC) signal for transmission across a dielectric barrier of the TEI galvanic isolation barrier 500. In an example, the TEI galvanic isolation barrier 500 is implemented as a single chip solution within the relay device. In an example, the TEI galvanic isolation barrier 500 provides dielectric isolation of ~200V continuous voltage and ~2 kV breakdown voltage. The TEI galvanic isolation barrier 500 is powered from an input signal, eliminating input circuit biasing. The TEI galvanic isolation barrier 500 is an intrinsic rectifier and provides true root mean squared (RMS) filtering that is programmable by the thermal design of the TEI galvanic isolation barrier 500. Components of the TEI galvanic isolation barrier 500 are disposed atop a field oxide layer 512 which is disposed atop a bulk silicon layer 530.

The TEI galvanic isolation barrier 500 receives an input signal (i1) across a resistor 510a. In an example, the resistor 510a is constructed of a thin film metal. The opposite side of the resistor 510a is electrically coupled to a current return path, such as common terminal 209.

By way of example, a faraday shield 514a is disposed between the resistors 510 and a thermal sensor 526. The thermal sensor 526 utilizes the Seebeck effect to convert the thermal signal produced by the resistors 510 to electrical energy. The Seebeck effect is a phenomenon in which a temperature difference between two dissimilar electrical conductors or semiconductors produces a voltage difference between the two substances. The thermal sensor 526 includes a top layer 516a disposed atop and coupled to a dielectric material 518. The top layer 516a is separated from a bridge layer 520 that spans between the input side of the TEI galvanic isolation barrier 500 and the output side of the TEI galvanic isolation barrier 500 by the dielectric material 518. The bridge layer is made of a material dissimilar to 516a,b and typically may be polysilicon. The thermal sensor 526 further includes a top layer 516b that is disposed atop the dielectric material 518 on an opposite side of the bridge layer 520 with respect to the top layer 516a. In an example, the top layers 516a and 516b comprise a thin film of metal such as aluminum. Another faraday shield 514b is disposed between a resistor 510b and the top layer 516b. The faraday shields 514a and 514b are electrically coupled to the common terminal 272 and provide shielding between the primary side of the TEI galvanic isolation barrier 500, the secondary side of the TEI galvanic isolation barrier 500, and the thermal sensor 526. The faraday shields 514a and 514b further mitigate dynamic coupling feed-through within the TEI galvanic isolation barrier 500. An operational amplifier 526 is electrically coupled to the top layers 516a and 516b.

For example, the input signal (e.g., the switch control signal) generates a thermal signal (e.g., heat) as it passes through the resistor 510a in an area proximate to the resistor 510a. The thermal signal induces a voltage within the top layer 516a and 520 via the Seebeck effect. The thermal signal will heat one side of the thermal sensor 526 and further induce a voltage within the top layer between 516a and 516b as measured at the opamp 526 input terminals. The operational amplifier 526 amplifies the voltage of the top layer 516a and drives and heats resistor 510b until the thermal signal at 516b equals the thermal signal at 516a. When the differential signal to the amplifier is zero, the circuit is balanced and the absolute magnitude of the current in 510b is equal to the current in 510a (I1), but those currents are dielectrically isolated from each other.

Figure 6:
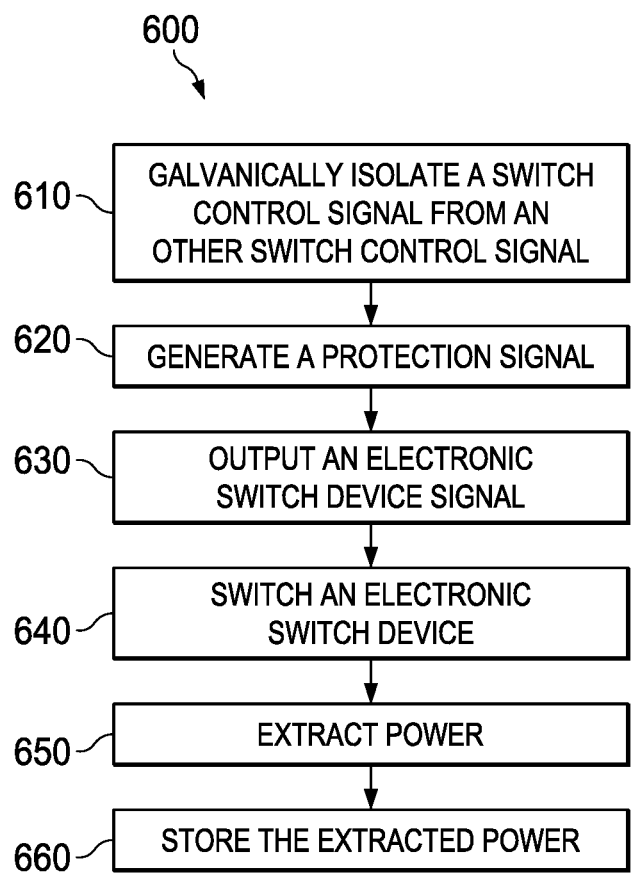
FIG. 6 illustrates an example method of initiating/terminating a power supply supplying power to a load.

In view of the foregoing structural and functional features described above, a method in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure.

FIG. 6 illustrates an example method 600 of coupling the power supply 180 and the load 190. At 610, the method 600 galvanically isolates an input terminal 105/205/207 of a relay device 100/200. In an example, the galvanic isolation can be provided by a thermo-electric-isolation (TEI) galvanic isolation barrier 500 that is coupled between the input terminal 105/205/207 of the relay device 100/200 and the protection control and power extractor 120. The switch control signal that is input to the TEI galvanic isolation barrier 500 is galvanically isolated from another switch control signal that is output from the TEI galvanic isolation barrier 500.

At 620, the method 600 generates a protection signal. This protection signal is generated in response to a determination of an operating parameter of the relay device 100/200. The protection signal is also generated in response to the other switch control signal at 610. In an example, the protection control and power extractor 120 checks for parameters (e.g., a temperature of the relay device 200, a periodic signal on a terminal of the relay device 200, a voltage of the power supply 180, a current drawn by a load 190, etc.) of the relay device 100/200 and generates the protection signal. At 630, method 600 outputs an electronic switch device signal. In an example, the protection control and power extractor 120 outputs the switch control signal to the switch 125 based on the generated protection signal. In another example, the relay controller 220 outputs the electronic switch device signal to the gate driver 240.

At 640, the method 600 switches an electronic switch device 125 to electronically initiate/terminate the power supply 180 supplying power to the load 190. This switching occurs in accordance with the electronic switch device signal. In an example, the protection control and power extractor 120 outputs the electronic switch device signal to the electronic switch device 125 to electronically initiate/terminate the power supply 180 supplying power to the load 190.

At 650, the method 600 extracts power. This power is extracted from the power supply 180 coupled to the relay device 100/200. The self-power control loop 210 monitors a voltage of the capacitor C4 and in response to the voltage falling below a pre-established threshold and switches the electronic switch device 125 to extract power from the power supply 180 with the capacitor C4. In response to the voltage reaching a pre-established threshold, the self-power control loop 210 switches the electronic switch device 125 to again initiate the power supply 180 to supply power to the load 190.

At 660, the method 600 captures the extracted power with an energy storage device. In an example, the self-power control loop 210 utilizes the capacitor C4 to capture this extracted power.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A relay device operable to be connected to a power supply and having an output, the relay device comprising:
   a galvanic isolation barrier operable to receive a first switch control signal and to output a second switch control signal;
   a protection control and power extractor coupled to the galvanic isolation barrier to receive the second switch control signal, the protection control and power extractor operable to generate a protection signal in response to a determination of an operating parameter of the relay device, extract power from the power supply and output an electronic switch device signal based on the generated protection signal; and
   an electronic switch device coupled to the protection control and power extractor and operable to initiate/terminate the power supply supplying power to the output of the relay device responsive to the electronic switch device signal.

2. The relay device of claim 1, wherein the galvanic isolation barrier is a thermo-electric-isolation (TEI) galvanic isolation barrier that includes an input on one side of the TEI galvanic isolation barrier that is coupled to a dielectric material, the dielectric coupled to a thermal sensor, wherein the switch control signal generates a thermal signal that passes across the dielectric to the thermal sensor, the thermal sensor generating the second switch control signal on an opposite side of the input of the TEI galvanic isolation barrier.

3. The relay device of claim 1, wherein the protection control and power extractor includes a self-powering control loop to extract the power from the power supply coupled to the relay device, the extracted power being stored in an energy storage device that is used to power the relay device while the power supply is supplying the power to the relay device and in the absence of the power supply supplying the power to the relay device.

4. The relay device of claim 3, further comprising a comparator to compare a voltage of the energy storage device to a threshold value and enable the self-powering control loop to extract the power from the power supply coupled to the relay device in response to the voltage of the extracted power falling below the threshold value.

5. The relay device of claim 1, wherein the electronic switch device includes a pair of metal-oxide semiconductor field-effect transistors (MOSFETs).

6. The relay device of claim 5, further comprising a gate driver to bias gates of the pair of MOSFETs in response to the electronic switch device signal and thereby initiate the power supply to supply power to the load.

7. The relay device of claim 1, wherein the protection control and power extractor includes one or more of a watchdog timer to monitor for a periodic signal on a terminal of the relay device as a basis to terminate the power supply supplying power to the load, a restart timer to count to a predetermined period of time as a basis to restarting the relay device and re-start the power supply supplying power to the load, a zero-cross detector to monitor when a voltage of the power supply is approximately zero as a basis to initiate the power supply to supply power to the load, a thermal shutdown detector to monitor a temperature of the relay device as a basis to shut down the relay device when the temperature exceeds a temperature threshold, and a current trip/zero cross window comparator to monitor a current drawn by the load as a basis to terminate the power supply supplying power to the load when the current exceeds a current threshold and in an event of the load being inductive, determining when an alternating current of the load diminishes to approximately zero in absence of the power supply supplying power to the load as a basis to terminate current flow from the power supply to the load.

8. The relay device of claim 1, wherein the galvanic isolation barrier includes a plurality of galvanic isolation barriers and the input includes a plurality of inputs, one of the galvanic isolation barriers coupled to one of the plurality of inputs and galvanically isolates a latch ON signal to initiate the power supply to supply power to the output of the relay device and an other of the galvanic isolation barriers coupled to an other of the plurality of inputs and galvanically isolates a latch OFF signal to terminate the power supply supplying power to the load.

9. The relay device of claim 1, wherein the output of the relay is coupled to a heating/air conditioning load.

10. A relay device operable to be connected to a power supply and having an output, the relay device comprising:
a thermo-electric-isolation (TEI) galvanic isolation barrier operable to receive a first switch control signal and output a second switch control signal;
a relay controller coupled to the TEI galvanic isolation barrier and operable to generate a gate driver signal in response to receiving a protection signal from a protection element of the relay device;
a self-power control loop coupled to the relay controller and operable to extract power from the power supply, store the power in an energy storage device, monitor a voltage of the energy storage device, and cause the relay controller to output the gate driver signal in response to the voltage of the energy storage device falling below a threshold value; and
a pair of metal-oxide semiconductor field-effect transistors (MOSFETs) to initiate/terminate the power supply supplying power to the output of the relay device responsive to the gate driver signal.

11. The relay device of claim 10, further comprising one or more of a watchdog timer to monitor for a periodic signal on a terminal of the relay device as a basis to terminate the power supply supplying power to the load, a restart timer to count to a predetermined period of time as a basis to restarting the relay device and re-start the power supply supplying power to the load, a zero-cross detector to monitor when a voltage of the power supply is approximately zero as a basis to initiate the power supply to supply power to the load, a thermal shutdown detector to monitor a temperature of the relay device as a basis to shut down the relay device when the temperature exceeds a temperature threshold, and a current trip/zero cross window comparator to monitor a current drawn by the load as a basis to terminate the power supply supplying power to the load when the current exceeds a current threshold and in an event of the load being inductive, determining when an alternating current of the load diminishes to approximately zero in absence of the power supply supplying power to the load as a basis to terminate the power supply supplying power to the load.

12. The relay device of claim 10, wherein the TEI galvanic isolation barrier includes a plurality of TEI galvanic isolation barriers and the input includes a plurality of inputs, one of the galvanic isolation barriers coupled to one of the plurality of inputs and galvanically isolates a latch ON signal to couple the power supply and the load and an other of the TEI galvanic isolation barriers coupled to an other of the plurality of inputs and galvanically isolates a latch OFF signal to terminate the power supply supplying power to the load.

* * * * *